UNITED STATES PATENT OFFICE.

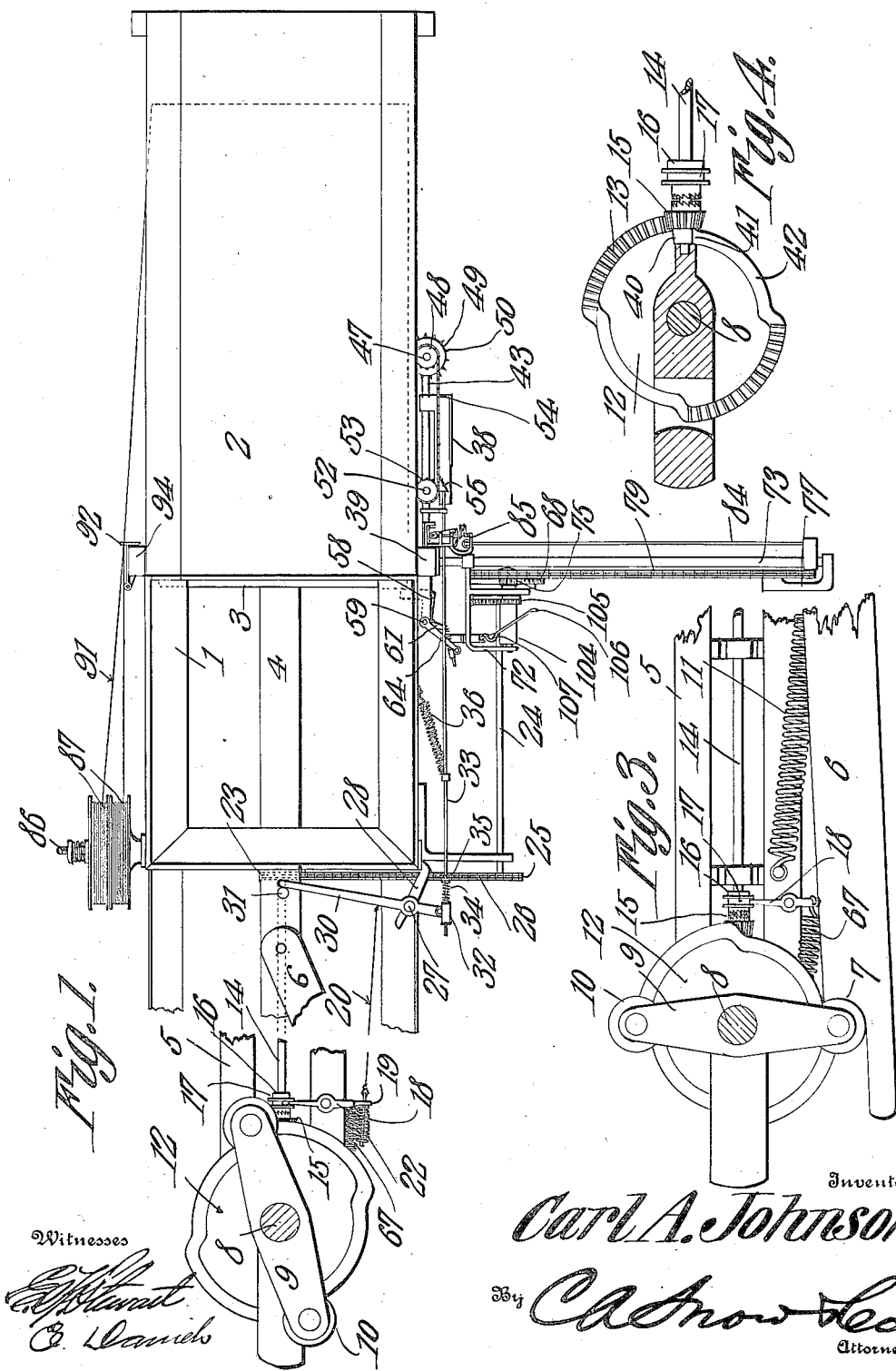

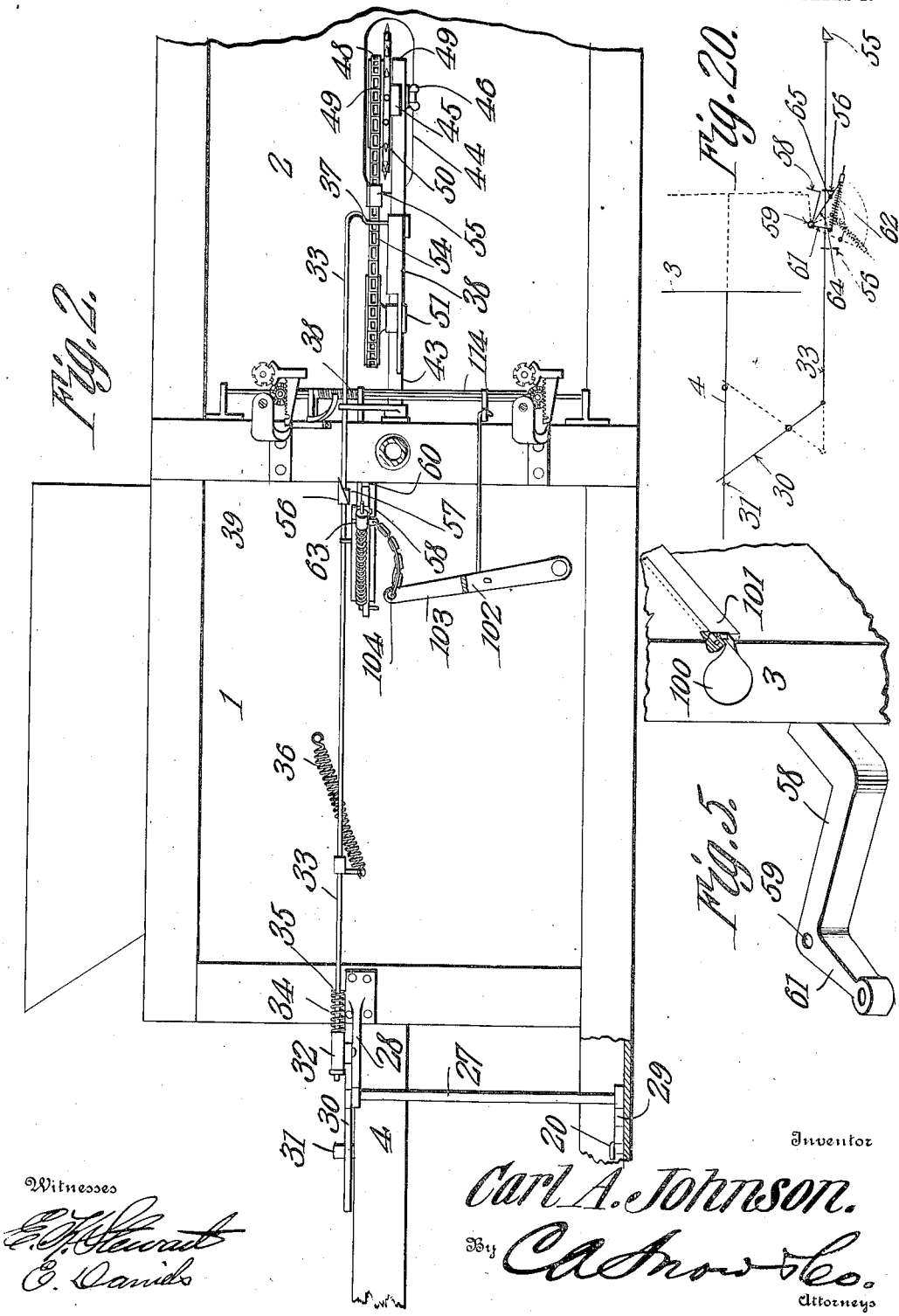

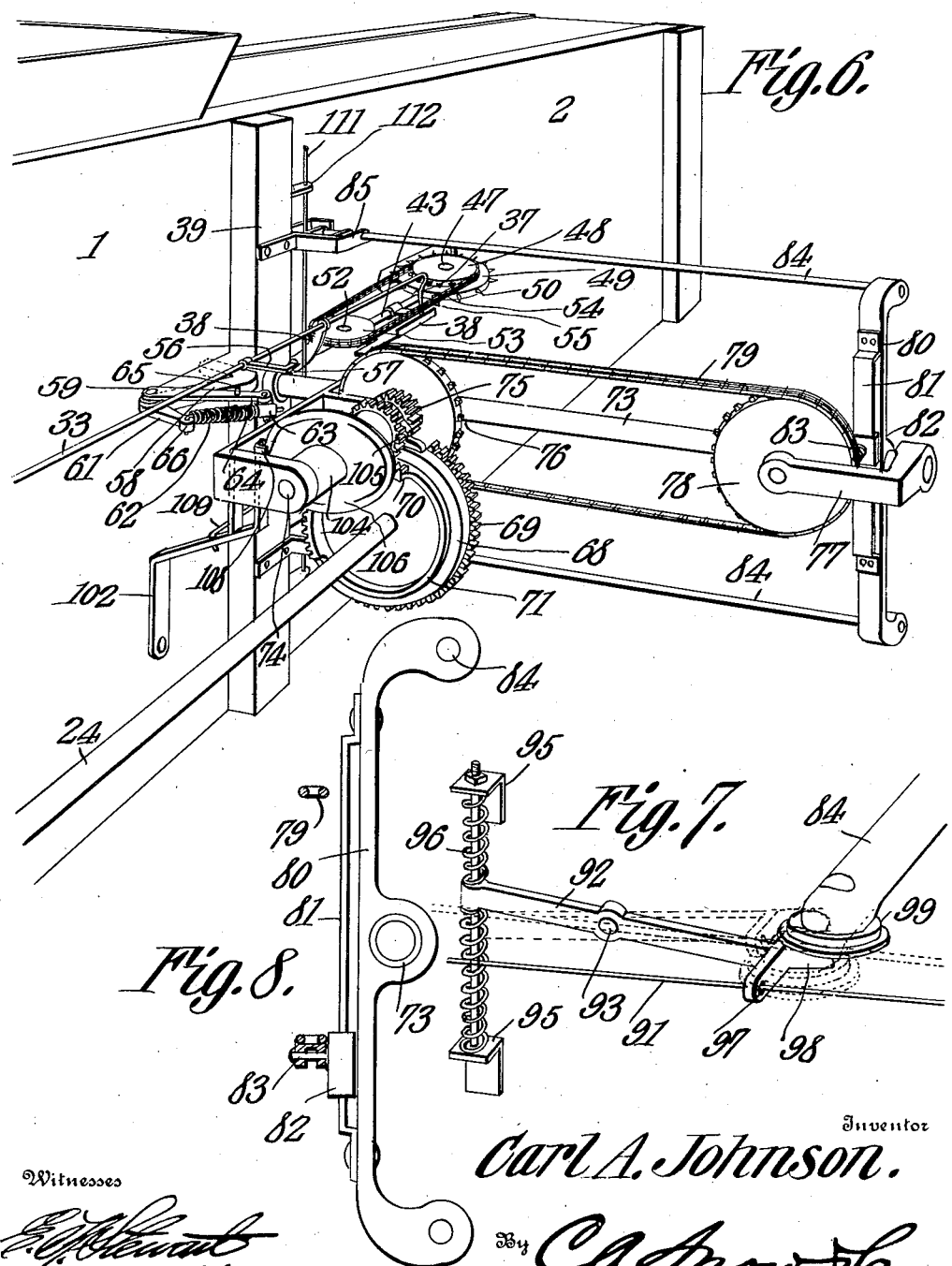

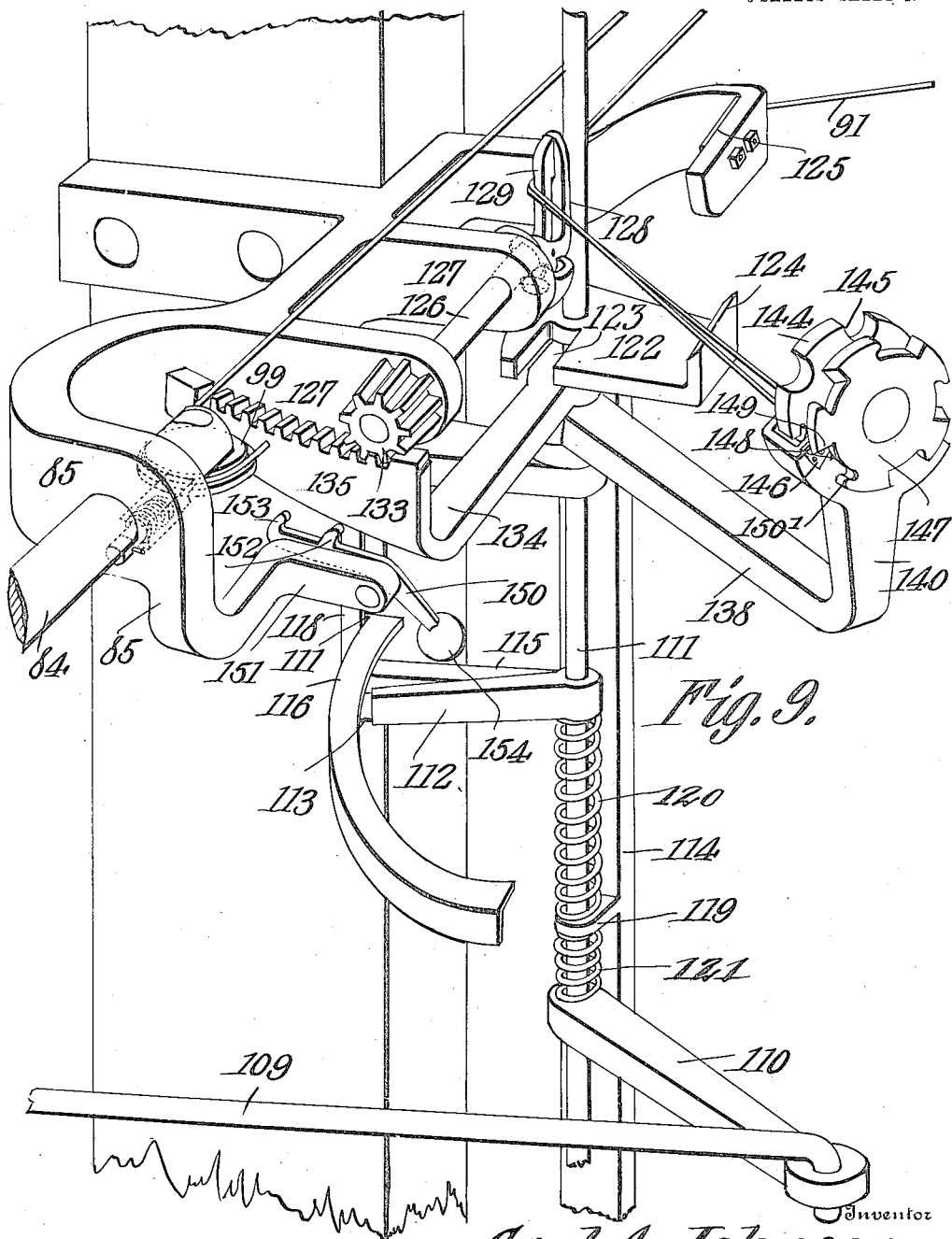

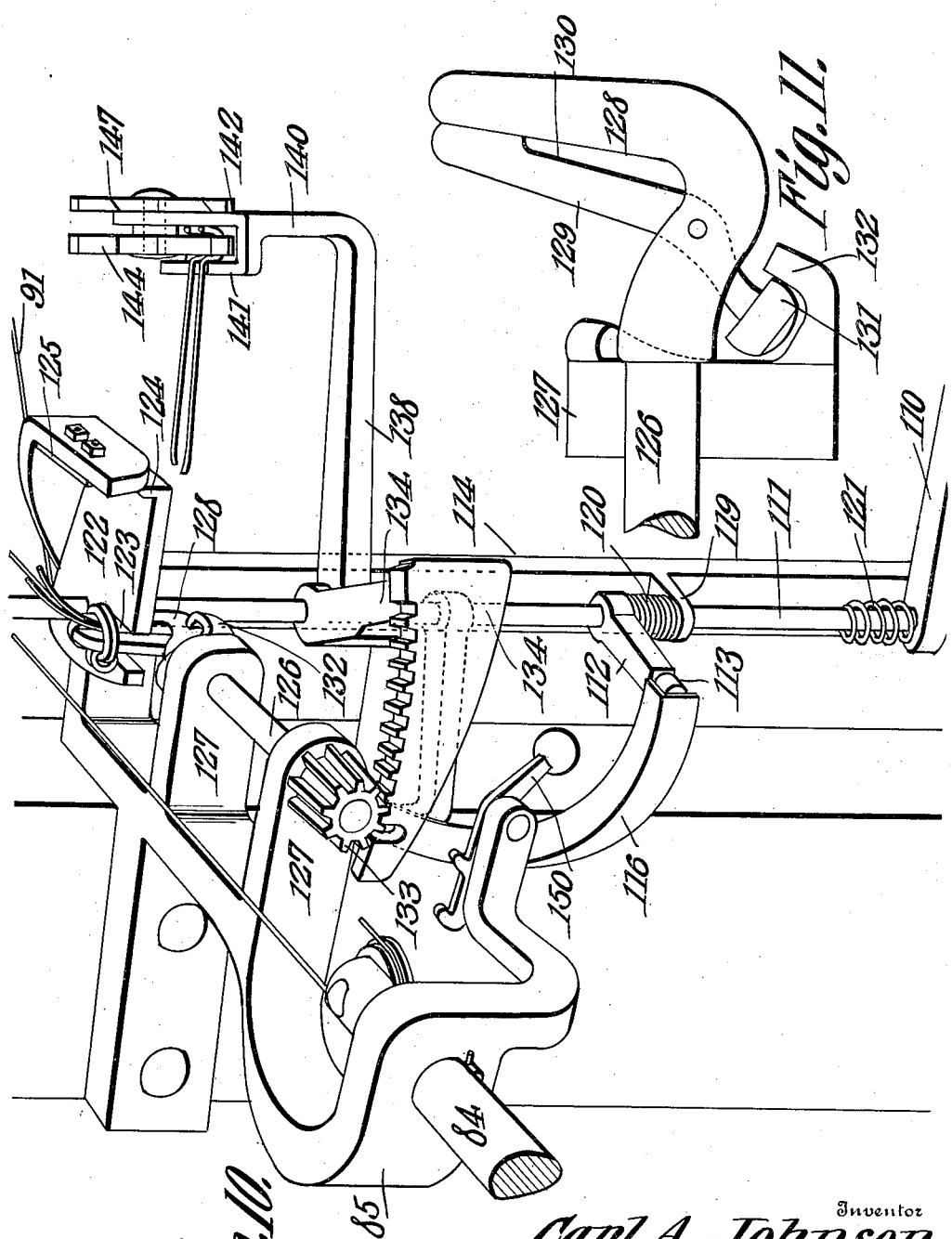

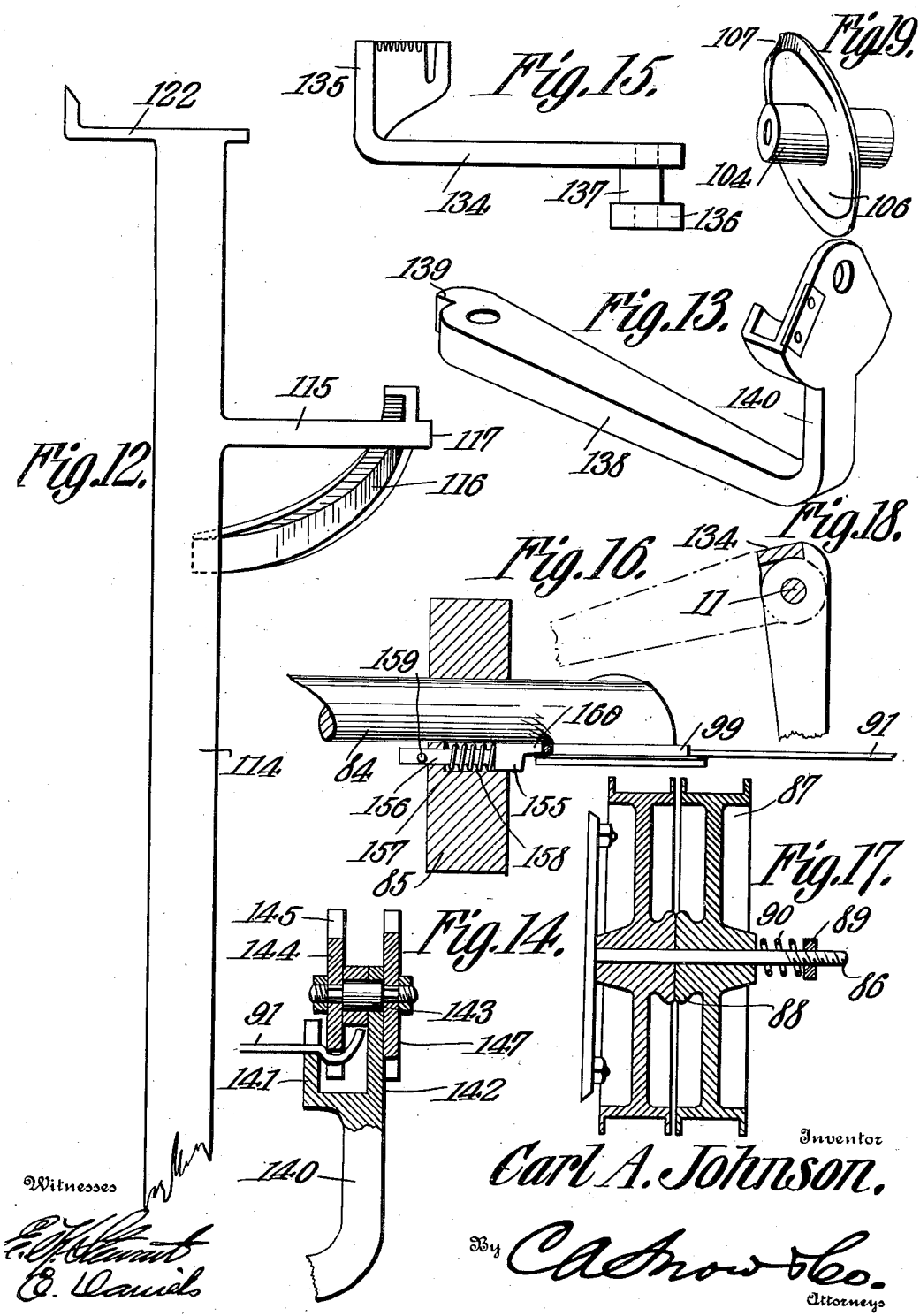

CARL A. JOHNSON, OF TOLAR, TERRITORY OF NEW MEXICO, ASSIGNOR OF ONE-FIFTH TO JOHN C. LEAVELLE, OF TAIBAN, TERRITORY OF NEW MEXICO.

TYING MECHANISM FOR BALING-PRESSES.

966,099.      Specification of Letters Patent.      Patented Aug. 2, 1910.

Application filed February 26, 1909. Serial No. 480,128.

*To all whom it may concern:*

Be it known that I, CARL A. JOHNSON, a citizen of the United States, residing at Tolar, in the county of Roosevelt and Territory of New Mexico, have invented a new and useful Tying Mechanism for Baling-Presses, of which the following is a specification.

This invention has relation to tying mechanism for baling presses, and it consists in the novel construction and arrangement of its parts hereinafter shown and described.

The object of the invention is to provide for a baling press in which a reciprocating plunger is used for compressing the bale, and a sweep mechanism is employed for actuating the same, a tying mechanism having a timer adapted to coöperate with the bale, and which is actuated by the movement of the bale to throw the tying mechanism in gear with the sweep or device for actuating the plunger whereby the bale is effectually bound by wire at its completion, and the ends of the wire are securely tied together.

A further object of the invention is to provide a simple and effective means for holding the bale-binding wires taut during the process of forming the bale, whereby the said binding wires are maintained in their proper relative positions prior to and during the operation of the tying mechanism, thereby rendering it impossible for the tying mechanism to operate without engaging and tying the wires as indicated.

In the accompanying drawings: Figure 1 is a plan view of a baling press, with parts broken away, showing the tying mechanism applied thereto. Fig. 2 is a side elevation of the box of the baling press, showing the tying mechanism applied thereto. Fig. 3 is a plan view of the sweep end of the baling press. Fig. 4 is a bottom view of a disk which is mounted upon the sweep shaft of the press. Fig. 5 is a perspective view of a portion of the plunger of the press, showing a catch for holding the same in position. Fig. 6 is a perspective view of a portion of the box of the baling press, showing the tying mechanism applied thereto. Fig. 7 is a perspective view of a wire guide used in the mechanism. Fig. 8 is an edge view of a needle frame which is used in the tying mechanism. Fig. 9 is a perspective view of one of the series of wire-tying mechanisms, showing the parts in their relative positions when a knot is about to be formed. Fig. 10 is a perspective view of the same mechanism, showing the positions of the parts after the knot is tied and about to the stripped from the knotter-bill. Fig. 11 is a detailed side elevation of the knotter-bill. Fig. 12 is a side elevation of a portion of a bar used in the tying mechanism for actuating the knot strippers. Fig. 13 is a perspective view of an arm used in the tying mechanism for gripping and holding the wire during the tying operation. Fig. 14 is a sectional view of a portion of the said arm and attached parts, showing the manner in which the wire is held during the tying operation. Fig. 15 is a perspective view of an arm used in the mechanism for actuating the knotter-bill. Fig. 16 is a side elevation of a portion of one of the needles used in the tying mechanism, illustrating the manner in which the same coöperates with a wire-securing device also used in the mechanism. Fig. 17 is a vertical sectional view of wire reels used in the mechanism, illustrating the manner in which the said reels have frictional contact with each other for the purpose of maintaining the wires at proper tension during the tying and bale-forming operation. Fig. 18 is a sectional plan view of the wire holding and knotter actuating arms at their points of connection. Fig. 19 is a detailed view of a disk used in the mechanism. Fig. 20 is a diagrammatic view of a tripping mechanism used in the tying mechanism.

As above stated, the tying mechanism is especially adapted to be used in that character of baling presses in which a reciprocating plunger operates in a baling box, and which is actuated by a sweep mechanism. Such a press consists of the baling box 1, which is continued, at one end, into the baling chamber 2, and in which is mounted a plunger 3, for reciprocation. The pitman 4 is attached at one end to the plunger 3 and extends, at its other end portion, along the sills 5 which form a portion of the framework of the press, and which connect the sweep mechanism with the box 1. A bar 6 is pivotally connected with that end of the pitman 4 opposite to the end thereof to which the plunger 3 is attached, and is provided with the usual notch 7. A sweep-shaft 8 is journaled for rotation at those ends of the sills 5 opposite the ends thereof which connect with the box 1, and an arm 9 is fixed to the said shaft 8. The arm 9 is provided at its ends with the journaled rolls 10, which are adapted successively to enter the notch 7 of the bar 6, and move the said bar, together with the pitman 4 and the plunger 3 longitudinally of the baling box 1. A retracting spring 11 is attached at one end to one of the sills 5, and connected at its other end with the bar 6 or the pitman 4, and serves as a means for withdrawing the plunger 3 when the bar 6 is disengaged by one of the rolls 7, or, instead of the said spring, any other common expedient may be used for retracting the said plunger 3. A disk 12 is mounted upon the shaft 8, and is provided upon its under side with the interrupted gear teeth 13. A shaft 14 is journaled at its ends in suitable bearings provided at the end of the baling box 1 and in the vicinity of the sweep shaft 8. A beveled pinion 15 is loosely journaled upon the shaft 14 and lies in the path of movement of the gear teeth 13 upon the disk 12. A clutch member 16 is feathered upon the shaft 14 and is provided with a peripheral groove 17. A lever 18 is fulcrumed upon one of the sills 5 and is provided with a forked end which lies in the groove 17 of the clutch member 16. The opposite end of the lever 18 is provided with an eye 19, through which the rod 20 passes. A coil spring 21 is interposed between one side of the lever 18 and a nut 22 which is screwed upon the end of the rod 20. A sprocket wheel 23 is fixed to that end of the shaft 14 adjacent the baling box 1. A shaft 24 is journaled for rotation adjacent one of the sides of the baling box 1, and the sprocket wheel 25 is fixed to one end of the shaft 24. A sprocket chain 26 passes around the sprocket wheels 23 and 25. A vertically disposed shaft 27 is journaled for rotation in an arm 28, which is supported by the end of the baling box 1. An arm 29 is fixed to the lower end portion of the shaft 27, and the inner end of the rod 20 is pivotally attached to the outer portion of the arm 29. A lever 30 is fixed to the upper end portion of the shaft 27 and its end lies in the path of movement of the stop 31, which is fixed to the upper side of the plunger 4. A sleeve 32 is pivotally attached to the outer end of the lever 30, and a rod 33 passes through the said sleeve 32. A coil spring 34 surrounds that portion of the rod 33 in the vicinity of the sleeve 32 and is interposed between the end of the said sleeve and an adjustable nut 35, mounted upon the said rod 33. A tension spring 36 is attached at one end to the side of the baling box 1, and, at its other end, is connected with the rod 33. The tension of the said spring 36 has a tendency to move the rod 33 longitudinally away from the shaft 27. The opposite end of the rod 33 from that end which is located in the sleeve 32 is projected along the side of the baling chamber 2, and is downwardly bent or disposed as at 37. The end portion 37 of the rod 33 is slidably supported in a guide 38, which is supported by one of the upright posts 39 of the frame-work of the baling box 1.

The pinion 15 is provided upon one side with an extension 40, which in turn is provided with a flattened side 41, which is adapted at times to move over the flat portions 42 upon the periphery of the disk 12, and forms a lock for holding the said pinion 15 against rotation. The said flat portions 42 are alternately arranged with relation to the sets of gear teeth 13, also carried by the said disk 12.

It has heretofore been stated that the guide 38 is supported by the upright 39 of the body of the press, but it is not directly attached to the said upright, but is mounted upon an arm 43, which in turn is fixed at one end to the said upright 39. The said arm 43 extends parallel with the side of the baling chamber 2, and the said baling chamber is provided in the vicinity of the opposite end of the arm 43 with an opening 44.
A clamp 45 is adjustably attached to the end of the arm 43 in the vicinity of the opening 44 and is held in adjusted position by means of a wing nut 46. A pintle 47 is mounted upon the clamp 45 and a sprocket wheel 48 is journaled upon said pintle. A disk 49 is fixed concentrically with relation to the sprocket wheel 48 and is provided at its periphery with a series of radiating pins 50, which, at the inner side of the said disk, project through the opening 44 in the side of the baling chamber 2. A sleeve 51 is mounted upon the inner portion of the arm 43 and is provided with a pintle 52, upon which is journaled a sprocket wheel 53. A sprocket chain 54 passes around the sprocket wheels 48 and 53 and is provided with a stop 55. The downturned end portion 37 of the rod 33 normally lies in the path of movement of the stop 55 while the latter is in its outer run. An arm 56 is mounted upon the rod 33 and is provided at its outer end with a beveled surface 57, which inclines upwardly toward the upright 39, as shown in Fig. 2. Said arm 56 is shown in perspective in Fig. 6 of the drawings. A catch 58 is pivoted at the point 59 upon a support extending to one side from the upright 39, and the side of the baling box 1 is provided with an opening 60 through which the inturned end of the said catch 58 is adapted to pass. From the pivot point 59 the catch 58 is provided with an outstanding lug 61, and a coil spring 62 is attached at one end to the said lug 61, and at its opposite end bears against a collar 63, which is pivoted at the end of a lever 64. The said lever is fulcrumed at the point 59 and is provided upon its upper side with a stop 65, which normally lies in the path of movement of the arm 59. When the arm 59 moves toward the stop 56 it engages the same and swings the lever 64. When the arm 56 moves in the opposite direction and has passed beyond the said stop 65, as will be hereinafter explained, the inclined lower surface 57 of the said arm 56 engages the upper end of the said stop 65 and rides over the same, and at the same time turns the rod 33. A rod 66 is attached at one end to the lug 61 and passes through the spring 64 and is also slidably mounted in the sleeve 63. Any suitable means is provided for limiting the movement of the sleeve 63 along the rod 66.

A description of the operation of the mechanism heretofore described is as follows:—As the shaft 8 is rotated the arm 9 is carried around with the same, and the rollers 10 successively engage the notch 7 in the bar 6. Thus the said bar 6 is moved longitudinally, which in turn will move the plunger bar 4 and cause the plunger to reciprocate in the baling box 1 of the press in the usual manner. As the said plunger 3 reciprocates the hay is fed into the box and is forced back into the baling chamber 2 and at the same time compressed. As the bale moves back into the rear portion of the chamber 2, the pins 50 carried by the disk 49 engage the side of the same, and the said disk is rotated. Inasmuch as the sprocket wheel 48 is fixed to the disk 49, the chain 54 is moved in an orbit about the sprocket wheels 48 and 53, and, as the stop 55 moves along its outer run it engages the downturned end 37 of the rod 33 and moves the said rod 33 longitudinally. As the said rod 33 moves longitudinally the arm 56 engages the stop 65 as above described and swings the said arm 58 upon the pivot 59. When the outer end of the lever 64 is swung beyond the outer end of the lug 61, and during such movement, the spring 62 is compressed and its tension increased. When the end of the lever 64 passes beyond the end of the lug 61, the tension of the spring 62 comes into play and forces against the end of the lug 61 and swings the catch 58 so that its inner end is projected through the opening 60 and behind the head of the plunger 3. The position of the parts is best illustrated in Fig. 1, showing the manner in which the inner end of the catch 61 projects behind the head of the plunger 3. Thus an obstruction is put in the path of the plunger and the plunger is held from retracting under the tension of the retraction spring 11. The plunger 3 however is not at the extremity of its compression stroke, it being approximately within the one half of an inch of the limit of its compression stroke. At the same time the rod 33, moving against the tension of the spring 36, swings the lever 30 and the shaft 27, and the opposite end of the lever 37 is moved into the path of movement of the stop 31 mounted upon the plunger-bar 4. In fact, this operation of the lever 30 takes place just prior to the projection of the end of the catch 56 behind the plunger 3, and consequently as the plunger advances to the completion of its compression stroke, the stop 31 swings the lever 30 and partially rotates the shaft 27. As the shaft 27 turns it carries around with it the arm 29 and the rod 20 is moved longitudinally, whereby the lever 18 is swung upon its fulcrum against the tension of the retraction spring 67, and the clutch member 16 is brought into engagement with the hub of the pinion 15. Thus the said pinion 15 is fixed with relation to the shaft 14, and as the disk 12 continues to rotate, one of the sets of gear teeth 13 engage the teeth of the pinion 15 and the shaft 14 is rotated. Through the sprocket wheel 23 at the inner end of the said shaft 14, and the sprocket chain 26 and the sprocket wheel 25, the shaft 24 is rotated. It is through the rotation of the shaft 24 that the needle-actuating and tying mechanism is operated, as will be hereinafter explained.

A master wheel 68 is fixed to the shaft 24 and is provided with a set of interrupted gear teeth 69 at its outer periphery, and an interrupted set of gear teeth 70 just within its periphery. A circular flange 71 joins at its ends with the ends of the set of gear teeth 70 in the manner as shown in Fig. 6 of the drawings. A bracket 72 is fixed to the outer side of the upright 19, and an arm 73 projects laterally from the outer side of the said upright 19. A stub shaft 74 is journaled for rotation in the bracket 72, and a gear wheel 75 is fixed to the said stub shaft 74 and is located in the path of movement of the gear teeth 69 upon the master wheel 68. A sprocket wheel 76 is also fixed to the shaft 74, and a bracket 77 is fixed to the outer end of the arm 73. A sprocket wheel 78 is journaled to the bracket 77 and the sprocket chain 79 passes around the sprocket wheels 76 and 78. A guide 81 is vertically mounted upon the needle frame 80, and a sleeve 82 is slidably mounted upon the said guide 81. The said sleeve 82 is provided with a laterally projecting pin 83, which is pivotally connected with one of the links of the sprocket chain 79, in the manner as illustrated in Fig. 8 of the drawings. The needles 84 are carried by the needle frame 80, and the inner ends of the said needles 84 are slidably mounted in the guides 85, which in turn are mounted upon the upright 39 of the body of the press. Thus it will be seen that as the shaft 24 rotates and the set of gear teeth 69 upon the master wheel 68 comes in contact with the teeth of the gear wheel 75, that the said shaft 74 is rotated, which rotates the sprocket wheel 76, and the chain 79 is moved in an orbit about the sprocket wheels 76 and 78.

Presuming that the parts are in the positions as shown in Fig. 6 of the drawings, as the chain 79 moves the sleeve 82 is first elevated along the guide 81, and then, as the pin 83 moves along the upper run of the said chain 79, the needle frame 80 is moved along the arm 73, and the inner ends of the needles 84 are projected across the end of the baling chamber 2 of the press. This movement occurs after the plunger has been secured in the position as shown in Fig. 1 of the drawings.

Referring now to the means for holding the wire and positioning the same in order that it may be engaged by the needles, attention is called to Fig. 1 of the drawings, in which it will be seen that upon the opposite side of the baling box from that upon which the mechanism hereinbefore described is located, is mounted a laterally disposed spindle 86. A detail of this spindle is shown in Fig. 17 of the drawings. The wire reels 87 are loosely journaled upon the spindle 86 and are provided with the hubs 88, which have frictional contact one with the other in the manner as indicated in Fig. 17 of the drawings. A nut 89 is screw-threaded upon the outer extremity of the spindle 86, and a coil spring 90 is interposed between the inner face of the said nut and the outer end of the hub of the outer wire reel 87. The wires 90 are reversely wound upon the reels 87, and the tension of the spring 90 is such as to have a tendency to force the hub of the outer reel against the hub of the inner reel, and keep the said wires 91 taut. The friction between the hubs of the said reels may be regulated to a nicety by adjusting the nuts 89 along the spindle 86. Upon the same side of the baling press as that upon which the reels 87 are located are also located the pivoted wire guides 92. Fig. 7 of the drawings is a detailed view of one of these wire guides, and, as they are both alike, a description of one will suffice for both. The wire guide is pivoted at the point 93 to an upright 94, which corresponds with the upright 39. Lugs 95 are fixed to the sides of the upright 94, and the coiled springs 96 are interposed between the ends of the lugs 95 and one end of the wire guide 92. One spring is located against each side of the guide 92, and as the tensions of the said springs are opposed to each other, they have a tendency to hold the said guides 92 in a normally substantially horizontal position.

The guide 92 is provided at its opposite end with an eye 97 through which the wire 91 passes. Said guide at the same end is provided with an inwardly and downwardly disposed lug 98 which normally lies in the path of movement of a flanged wheel 99, carried by the needle 84. Consequently, it will be observed that when the needle 84 is moved toward the wire guide 92 and the flanged wheel 99 engages the inclined lug 98 of the guide 92, that end of the said guide 92 is depressed. The flanged wheel 99 passes beyond that end of the guide 92 which carries the lug 98, so that the said guide 92, under the tension of the springs 96, will assume its normal horizontal position, and thus the wire 91 is carried up into the path of retractory movement of the flanged wheel 99. Thus, as the needle 84 retracts, the wire 91 is caught between the flange of the wheel 99 and the side of the needle 84, and the said wire is drawn back with the needle across the head of the bale.

By reference to Fig. 5 of the drawings, it will be seen that the plunger head 3 is provided with the transversely disposed channels 100, which are normally closed by the pivoted aprons 101. It is through these channels 100 that the needles 84 pass in the movement just above described, and when the plunger head 3 retracts, the wire which is drawn across with the needles may slip out of the channel 100 by coming in contact with the inner side of the apron 101 and swinging the same, and, as soon as this is done, the said apron 101 again assumes its vertical position in the same plane as the work facing surface of the plunger, and the channel 100 is closed and cannot fill with straw. Or, instead of the apron 101, the mouth of the channel 100 may be constricted sufficiently to permit the egress of the wire, and at the same time prevent the entrance of straw therein. A lever 102 is fulcrumed upon the side of the baling box 1 and is provided with an upstanding lug 103, which is connected by means of a chain 104 with the sleeve 63 mounted upon the rod 66. A sleeve 104 is loosely journaled upon the shaft 74 and a gear wheel 105 is fixed to said sleeve. The said gear wheel 105 lies in the path of movement of the gear teeth 70, carried by the master wheel 68. A disk 106, of peculiar configuration, is also fixed upon the sleeve 104, said disk being illustrated in detail in Fig. 19 of the drawings. The major portion of the disk 106 is approximately spirally disposed, but the disk is provided, at a point upon its periphery, with a laterally disposed detent or bend 107. One end of the lever 102 is formed into a shoe 108, which receives the edge of the disk 106. One end of a rod 109 is pivotally connected with an outstanding portion of the lever 102, and the opposite end of the said rod 109 is pivotally connected with an arm 110, which in turn is fixed to a rod 111, that is journaled for rotation in the lug 119, attached to the forward side of the upright 39. An arm 112 is fixed to the rod 111, and is provided at its outer end with a friction roller 113. A bar 114 is slidably mounted adjacent the side of the baling chamber of the press, and is provided with a laterally disposed arm 115, which in turn is provided with a spirally disposed guide 116. The said guide 116 lies in the path of movement of the friction roller 113 and the end of the arm 112. The arm 114 is provided with a projecting lug 117, which is adapted to operate behind a guide 118 (see Fig. 9 of the drawings) which is attached to the side of the baling chamber and which is adapted to permit the bar 114 to move vertically, but retains the same against any tendency to rotate. The bar 114 is provided with an outstanding lug 119 and a coil spring 120 is interposed between the upper surface of the said lug 119 and the lower side of the arm 112, and a coil spring 121 is interposed between the lower side of the lug 119 and the upper side of the arm 110. The coil spring 120 is relatively long, while the coil spring 121 is short. The spring 120 is under tension with a tendency to hold the arm 112 away from the lug 119, while the spring 121, when it is engaged by the lug 119 as the bar 114 moves downward, as will be hereinafter explained, is also subjected to tension, which, when the bar 114 is liberated, has a tendency to return the same bar and its attached parts to their normal position. A stripper plate 122 is attached to the bar and is provided with a recess 123. The said stripper plate above referred to is in duplicate upon the bar, but, as they are both alike, a description of one will answer for both. A cutting plate 124 is vertically disposed and is also carried by the stripper plates 122, and is adapted to coöperate with a cutting plate 125, which is carried by a portion of the guide 85. The said cutting plates 124 and 125 are adapted to coöperate with each other in severing the strands of wire after the bale has been tied.

From the above description it is obvious that when the disk 106 rotates with the sleeve 104, that the lever 102 will be swung upon its fulcrum, and that the rod 109 will be moved longitudinally. As the said rod moves longitudinally, it swings the arm 110, which in turn partially rotates the rod 111 in its bearings, and the arm 112 is carried around. Presuming that the parts are in the positions as shown in Fig. 9 of the drawings, as the arm 112 swings around the axis of the rod 111, the friction roller 113 engaging the under side of the guide 116 lifts the said guide as it moves along the same by reason of the fact that the said guide is spirally disposed. When the roller 113 has arrived at the lower end of the guide 116, the said guide has been elevated and the rod 114 has been moved longitudinally. As the said rod moves the stripper plate 122 is carried up, and the recess 123 receives the knotter-bill, (hereinafter to be described) and strips the knot from the same. At the same time the ends of the wires 91 are engaged upon opposite sides by the cutting plates 124 and 125, and the said wires are cut. This of course takes place after the wire has been passed around the bale and the knot formed therein. At the time that the rod 111 turns, as above described, and the rod 114 is moved upward, the spring 120 is compressed in the manner as shown in Fig. 10 of the drawings. Consequently, when the roller 113 passes below the lower end of the guide 116, the tension of the spring 120 comes into play and the bar 114 is quickly retracted into its normal position, and the roller 113 is elevated above the upper surface of the guide 116, for the reason that the said guide follows the bar 114 in its downward movement. Thus means is provided for quickly removing the cutting-plate 124 from the plate 125. When however the lug 119 comes in contact with the upper end of the spring 121, and the rod 111 is swung back into its original position by means of the spiral disk above referred to, the roller 113 comes in contact with the upper end of the guide 116, and slightly depresses the same, carrying down with it the bar 114. Thus the lug 119 is carried down against the end of the spring 121, which is subjected to tension, and when the roller 113 passes beyond the upper end of the guide 116 the tension of the said spring 121 comes into play and lifts the upper end of the guide 116 above the roller 113 into its normal position.

A knotter-shaft 126 is journaled for rotation in the laterally disposed lug 127 carried by the guide 85. A knotter-bill 128 is fashioned at the end of the shaft 126, and the pivoted bill 129 is connected with the bill 128. The said bill 129 is slightly narrower in cross section than the bill 128, in order to provide sufficient space for the ends of the wire to drag from the bill as the loop is stripped therefrom during the process last above described. During the time that the wire is gripped between the bills 128 and 129 the said wire is located in the space 130 which is just within the end of the bill 129. Means is provided for rotating the shaft 126 whereby the roller 131 carried at the opposite end of the bill 129 from that which has contact with the bill 128, is brought in contact with the flange 131 which is mounted at the side of one of the lugs 127, and which is adapted to open the bill 129 and to hold the same closed, much in the usual manner as those knotting devices used in harvesting machines. As no particular novelty is displayed in the manner in which the bill 129 is opened and closed, it is thought that a further description of this feature is unnecessary in this specification.

A gear wheel 133 is attached to that end of the shaft 126 opposite the end thereof upon which the bill 128 is mounted. An arm 134 is loosely mounted upon the rod 111. Fig. 15 is a detailed side elevation, with parts in perspective, of the said arm 134. The gear rack 135 is mounted at the outer end of the said arm 134, and the teeth of the said rack 135 are in mesh with the gear wheel 133. At its opposite end the arm 134 is provided with a spaced lug 136 with an intervening web 137. An arm 138 is fixed to the rod 111 and is located between the lug 136 and the arm 134. The said arm 138 is provided at its end adjacent the rod 111 with a rearwardly disposed lug 139 which, at times, is adapted to come in contact with the edge of the web 137 of the arm 134. At its outer end the arm 138 is provided with the upstanding portion 140, which, in turn, terminates in the upstanding spaced flanges 141 and 142. A shaft 143 is journaled for rotation in the upper portion of the flange 142, and a wire-holder 144 is fixed to the inner portion of the said shaft 143. The said wire-holder 144 is provided at intervals upon its periphery with the holding recesses 145. The recesses 145 are adapted to coöperate with the edge of the flange 141 in holding the wire 91 in the manner as illustrated in Fig. 14 of the drawings. A cutting-plate 146 is located at the end of the flange 142. Said plate is shown in the perspective view of Fig. 9. The cutting disk 147 is also fixed to the shaft 143 and is provided with the recesses 148, at one end of which are arranged the cutting edges 149, and at the opposite end the shoulders 150'. The cutting edges 149 are adapted to coöperate with the cutting plate 146 in severing the ends of the wire as they are taken from the needle in the manner to be hereinafter described.

When the rod 111 turns, as above described, it carries around with it the arm 138, and the side of the arm 138 comes in contact with the web 137 of the arm 134, the said arm 134 is also swung. As the segment 135 is moved toward the needle-shaft 84, the gear teeth carried by the segment 135 rotate the gear wheel 133 and the shaft 126. As the segment 135 moves under the gear wheel 133, the parts are brought into the positions as shown in Fig. 9 of the drawings, when the knotter-bill is in the position just prior to being actuated in tying the knot. When the arm 138 swings away from the needle-shaft 84 and in the vicinity of the end of its outward stroke, the lug 139 engages the web 137 of the arm 134, and the said arm 134 then moves from under the wheel 133 together with the arm 138. Thus the said wheel 133 is rotated and the shaft 126 is rotated, which carries around with it the knotter-bill 128, and the knot is tied in the usual manner. After the knot has been tied, the wires 91 are severed by the cutting-blades 124 and 125 in the manner heretofore described. A pawl 150 is pivotally attached to a projecting lug 151, carried by the guide 85, and the said pawl is provided with a finger 152 and a finger 153. The said fingers are spaced apart and are located in the path of movement of the disk 147. The end of the pawl 150 opposite to that end upon which the fingers 152 and 153 are mounted is weighted at 154, so that the said fingers are normally held in the path of movement of the said disk 147. A bolt 155 is provided with a shank 156 which passes transversely through the guide 85, and is located under the needle-shaft 84. A coil spring 157 surrounds the shank 156 of the said bolt and bears at one end against the head of the bolt, and at its opposite end against the bottom of a recess 158 provided in the said guide 85 for the reception of the said bolt shank. A pin 159 passes transversely through the projecting end of the shank 156 and is adapted to limit the outward movement of the bolt 155. The opposite end of the bolt 155 is provided with a flange 160, which is disposed toward the periphery of the flanged wheel 99.

The configuration of the disk 106 is such as to impart, through the lever 102 and the rod 109 and the connecting parts to the arm 138 the necessary movement to accomplish the cutting of the wire at the flange wheel 99 holding the same, carrying the same to tying position and holding the same while it is tied, which movement on the part of the arm 138 is as follows:—Presuming that the parts are in the positions as shown in Fig. 10 of the drawings when the stripper-plate 122 is in the act of ejecting a knot from the knotter-bill and the cutting-plates 124 and 125 have just severed the wires 91. The first movement on the part of the arm 138 is to move toward the arm 134, and when the side of the arm 138 engages the web 137 of the arm 134, the arm 134 is moved with the arm 138, and the gear-rack 135 is carried under the wheel 133, which rotates with it the knotter-shaft 126. Thus the knotter-bill is carried to the position as shown in Fig. 9 of the drawings. As the disk 147 approaches the first finger 152, carried by the pawl 150, one of the shoulders 150' will engage the said disk and partially rotates it which carries around with it the shaft 143 and the disk 144. Thus the ends of the wire which are held by the said disk 144 after the prior cutting operation of the cutting plates 124 and 125, are permitted to fall from the edge of the flange 141 of the upwardly disposed portion 140 of the arm 138. Just prior to the engagement of the shoulder 150' of the disk 147 with the finger 152, the needle-shafts 84 have moved transversely across the baling chamber, and the wire is drawn toward the guide 85. At the time that the shoulder 150' engages the finger 152, one of the notches 145 of the disk 144 engages the first run of the wire 91 around the wheel 99, and the said wire is impinged between the said notch 144 and the edge of the flange 141. As the arm 138 continues to move toward the wheel 99, the disk 147 is further rotated by reason of the fact that the next shoulder 150' engages the finger 153, which movement on the part of the disk 147 causes one of the blades 149 to cut the wire against the cutting blade 146. The arm 138 then moves to one side sufficiently to permit the needle-shaft 84 to move transversely across the baling chamber upon its next operation. At the completion of the next bale the needle-shaft 85 moves as last above indicated and another strand of wire is brought across. The arm 138 first moves toward the needle-shaft and grasps the nearest wire and cuts the same as above indicated. Then the arm 138 moves into position as shown in Fig. 9 of the drawings; from which it will be seen that the wires 91 are partially twisted around the knotter-bill 128. The knotter-bill is then rotated as above indicated and the wires are carried between the cutting-plates 124 and 125 and are severed as above described. As this is done, the arm 134 is swung, as above described, and the knotter-bill is turned into its normal position.

The following is a supplemental description of the operation of the tripping mechanism which is shown in the diagrammatic view Fig. No. 20. When the lug 55 comes in contact with the downturned end of the rod 33, the said rod 33 is moved toward the lever 30 and swings the opposite end of the said lever into the path of movement of the knob 31 carried by the plunger bar 4. The plunger at this time is moving in its compression stroke, and thus the knob 31 continues the swinging movement of the lever 30, and the rod 33 is continued in its longitudinal movement and is carried away from the stop 55, and the arm 56 engages the stop 65 upon the lever 64, and the said lever is swung from the position shown in heavy lines into the position shown in dotted lines in Fig. 20. Thus the hook 58 is projected behind the plunger 3 in the manner as indicated in dotted lines in the said figure. When the lever 102 is swung by the disk 106 the lever 64 is swung back into its normal position by means of the connecting chain 104, but this cannot occur until the plunger 3 is moved to the extremity of its compression stroke, for the reason that the back pressure upon the said plunger holds the catch 58 behind the same. When however the next roller 10 engages the plunger bar 6 the said plunger head 3 is moved toward the extremity of its compression stroke the approximately one half inch it is permitted to retreat in order to engage the catch 58, as hereinbefore described. This forward movement of the plunger releases the catch 58 and the same is immediately pulled out by the spring 62 in response to the pull exerted by the chain 104. Thus the plunger 3 is free to retract. The stop 65 mounted upon the lever 64 travels in an approximately arcuate path, while the arm 56 carried by the rod 33 travels in a straight line.

The consecutive order of operation of all the parts of the machine in tying a bale is as follows:—Part 55 pushes rod 33 until stop 31 strikes lever 30 and turns the shaft 27 about one fourth of a revolution, (resulting in arm 29 pulling clutch member 16 against the clutch hub of the gear wheel 15, arm 56, trip lever 64, which causes the catch 38 to move inward behind the plunger head 3 at the inward portion of its compression stroke). The movement above described, in parenthesis, occurs simultaneously. Then the master wheel 68 turns, and, during its one revolution, it first turns wheel 75, and next, wheel 105. Wheel 75 operates the needles, and when they have crossed the chambers and returned, the disk 106 operates the knotter and also returns the parts to the position shown in Fig. 6. When the tying is completed the next roller 10 strikes the plunger bar 6, which releases the catch 38 and the plunger 3 is released and is free to rebound.

Having described my invention, what I claim as new, and desire to secure, by Letters Patent, is:—

1. In a bale-tying mechanism a pivoted wire guide, a needle arranged to move transversely of the wire held by the guide, said guide lying in the path of movement of the said needle.

2. In a bale-tying mechanism a pivoted wire guide, spring means for holding the said guide in a normal position, a needle arranged for a movement transversely of the wire held by the guide, said guide normally lying in the path of movement of the said needle.

3. In a bale-tying mechanism, a pivoted wire guide, oppositely disposed springs bearing against the said guide to maintain the same in a normal, intermediate position, a needle arranged to move transversely of the wire carried by the guide, the said guide lying in the path of movement of the said needle.

4. In a bale-tying mechanism a spring-retained pivoted wire guide, said guide having upon one side a wire-receiving eye, and upon its opposite side an inwardly disposed lug, a needle arranged to move transversely of the wire held by the guide, the lug carried by the guide lying in the path of movement of the needle.

5. In a bale-tying mechanism, a pivoted wire guide, a needle arranged to move transversely of the wire held by the guide, a flanged wheel carried by the needle, said guide having a lug which is inclined with relation to the path of movement of the wheel carried upon the needle, and which normally lies in the path of movement of the said wheel.

6. In a bale-tying mechanism, a spring-retained pivoted wire guide, a needle arranged to move transversely with relation to the wire carried by the guide, a flanged wheel carried by the needle, said guide having a lug inclined with relation to the plane of movement of the wheel carried by the guide, said lug normally lying in the path of movement of the said wheel.

7. In a bale-tying mechanism a plunger mounted for reciprocation, means for holding the plunger in a fixed position in the vicinity of the extremity of its completion stroke, said plunger having a channel in its work facing surface, and a needle arranged to traverse the length of the channel when the plunger is held in a fixed position.

8. In combination with a baling press having a plunger mounted for reciprocation in a baling box, a catch mounted upon the box, means for projecting the catch into the path of movement of the plunger to hold the same in a fixed position, a needle mounted to traverse the plunger while in fixed position, and means for withdrawing the catch when the needle retreats from the plunger.

9. A baling press comprising a baling box and a plunger mounted for reciprocation therein, a spring-restrained catch mounted upon the box, means for projecting the catch into the path of movement of the plunger to hold the same in a fixed position, a needle mounted to traverse the plunger while in fixed position, and means for withdrawing the catch when the needle retreats from the plunger.

10. A baling press comprising a baling box, and a plunger mounted for reciprocation therein, a catch mounted upon the box, means operated at the completion of the bale for projecting the catch in the path of movement of the plunger to hold the same in fixed position, a needle arranged to traverse the plunger while in fixed position, and means for withdrawing the catch when the needle retreats from the plunger.

11. A baling press comprising a baling box and a plunger mounted for reciprocation therein, a catch mounted upon the box, means for projecting the catch into the path of movement of the plunger to hold the same in fixed position in the vicinity of the extremity of its compression stroke, a needle arranged to traverse the plunger while in fixed position, and means for withdrawing the catch from the path of movement of the plunger when the needle retreats from the same.

12. A baling press comprising a baling box and a plunger mounted for reciprocation therein, a catch mounted upon the box, means for projecting the catch into the path of movement of the plunger to hold the same in fixed position in the vicinity of the extremity of its compression stroke, means for actuating the catch-operating means at the completion of the bale, a needle arranged to traverse the plunger while in fixed position, and means for removing the catch from the path of movement of the plunger when the needle retreats from the same.

13. The combination in a baling press of a plunger, a needle arranged to traverse the box of the press, means for actuating the needle, and a timing mechanism operated by the bale for holding the plunger in a fixed position.

14. The combination of a baling press of a plunger, a needle arranged to traverse the baling box of the press, a spring-restrained pivoted catch mounted upon the box, means for projecting the catch into the path of movement of the plunger, which means is operated initially by the bale and finally by the plunger, and means for withdrawing the catch from the path of movement of the plunger.

15. The combination with a baling press having a reciprocating plunger, a needle arranged to traverse the plunger, a catch pivotally mounted upon the box of the press and adapted to be projected into the path of movement of the plunger, a lever fulcrumed to the box of the press, a spring interposed between the free end of said lever and the free end of said catch, a rod mounted for reciprocation and having means for engagement with said lever, means for moving said rod initially upon the completion of the bale and finally by the stroke of the plunger, and means for withdrawing said rod to its initial position.

16. In a bale-tying mechanism a needle frame mounted for reciprocation, a needle carried by the frame, a sleeve slidably mounted upon the needle frame, an endless belt mounted for orbital movement adjacent the needle frame and being operatively connected with the same, and means for moving the belt.

17. In a bale-tying mechanism a needle mounted for reciprocation, a wire-engaging wheel journaled upon the needle, and a spring-pressed pawl mounted at the end of the retractory stroke of the needle and adjacent the wheel carried thereby.

18. In a bale-tying mechanism a needle mounted for reciprocatory movement, a flanged wire-engaging wheel carried by the needle and a spring-pressed pawl located at the end of the retractory stroke of the needle and in the vicinity of said flanged wheel.

In testimony that I claim the foregoing as my own, I have hereto affixed my signature in the presence of two witnesses.

CARL A. JOHNSON.

Witnesses:
JACOB B. SLAUGHT,
SAMUEL E. GUILLIAMS,